UNITED STATES PATENT OFFICE.

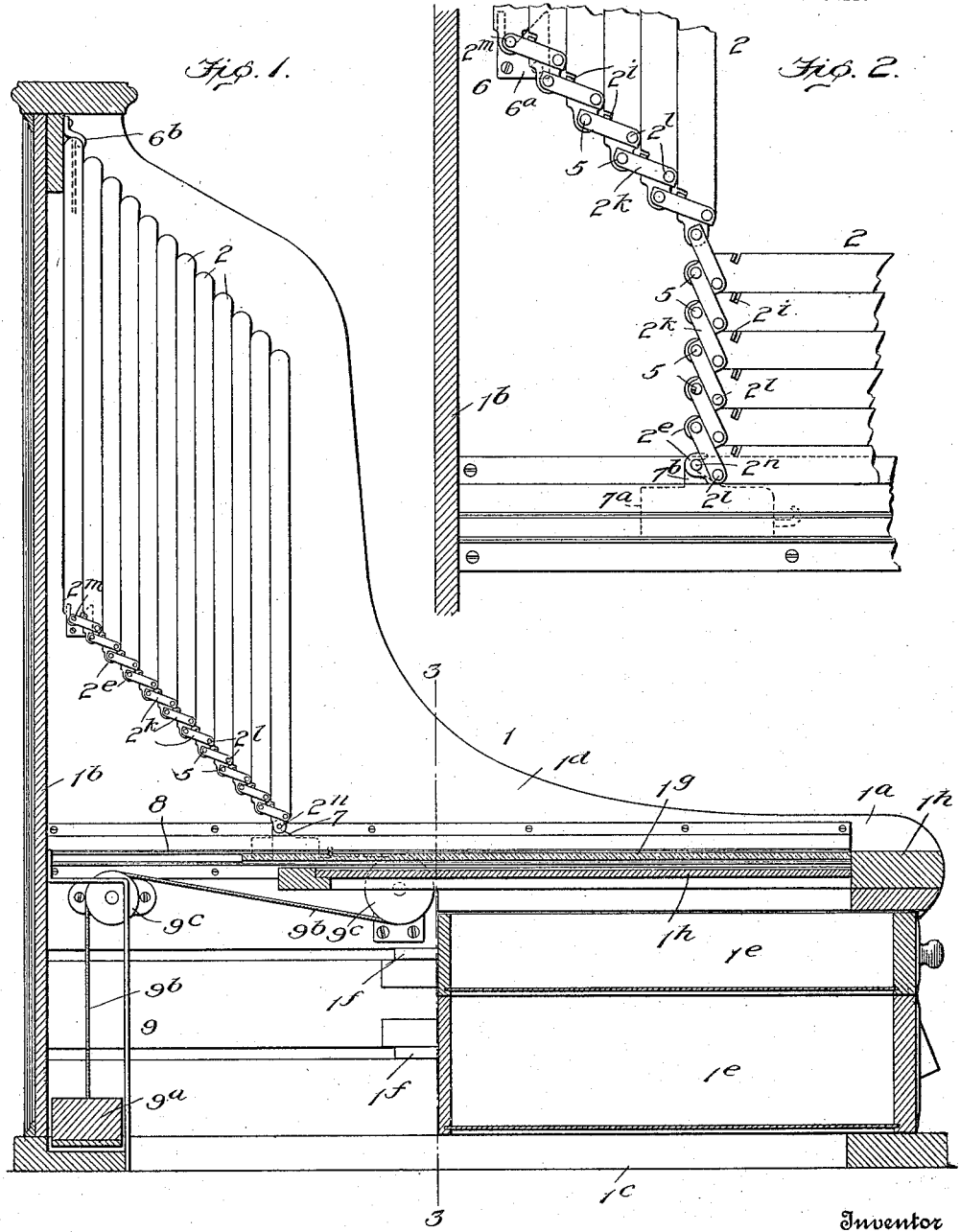

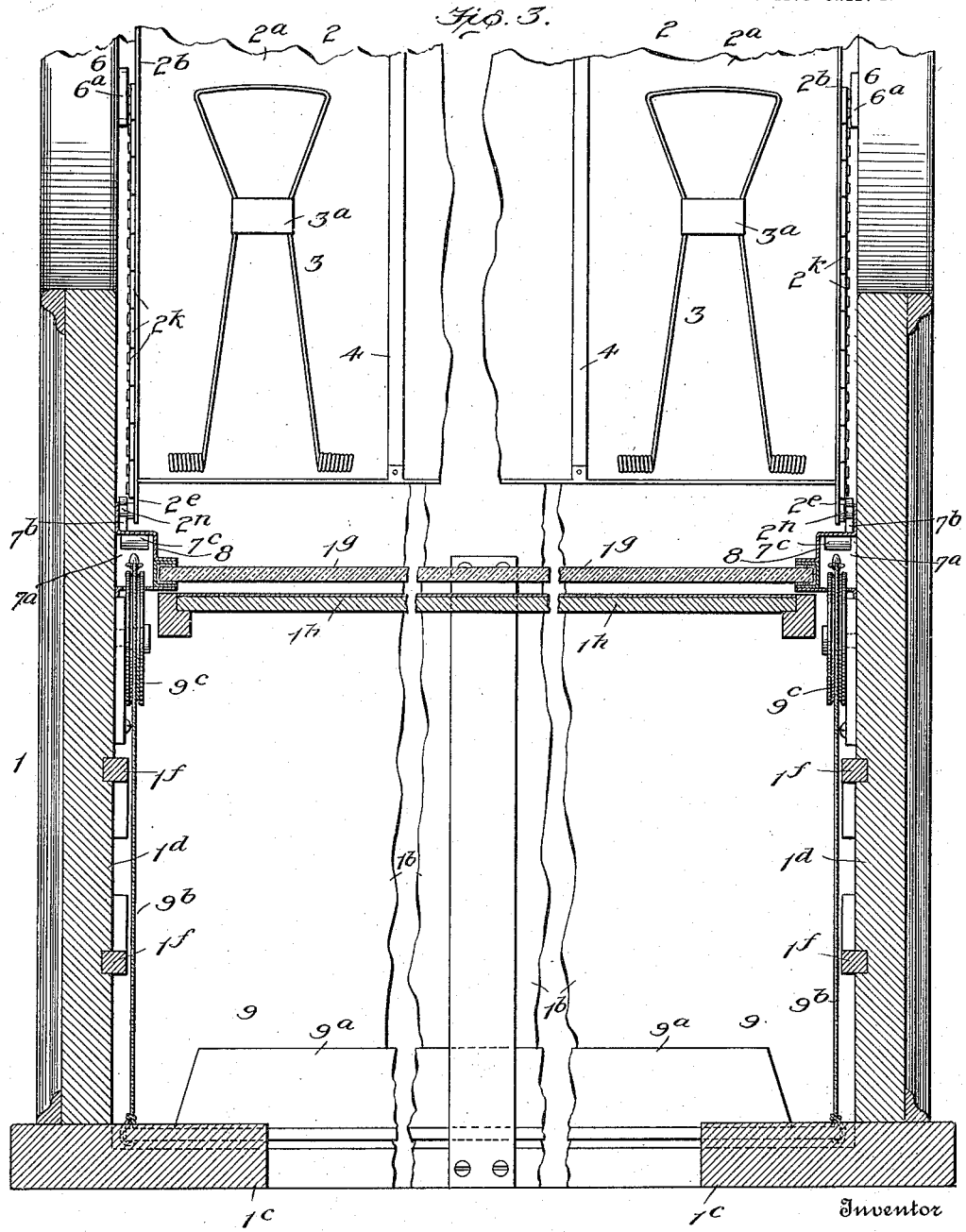

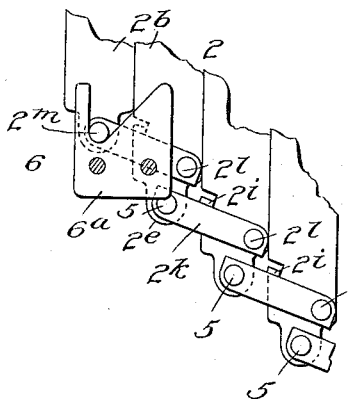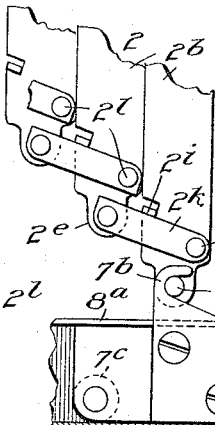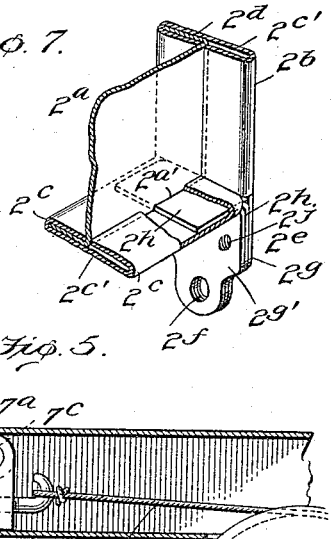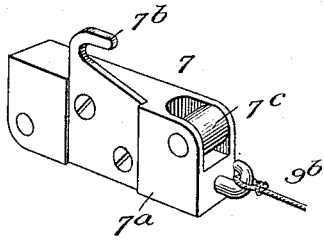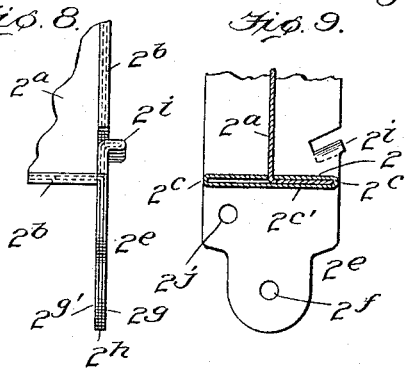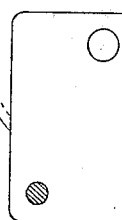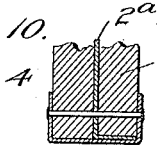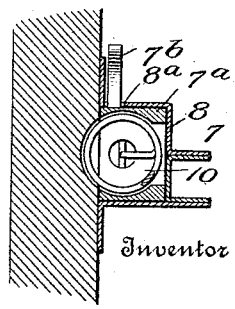

GEORGE JACOBS, OF CLEVELAND, OHIO, ASSIGNOR, BY MESNE ASSIGNMENTS, TO THE McCASKEY REGISTER COMPANY, OF ALLIANCE, OHIO, (INCORPORATED IN 1914,) A CORPORATION OF OHIO.

FILING APPLIANCE.

1,160,412.      Specification of Letters Patent.      Patented Nov. 16, 1915.

Application filed June 7, 1911. Serial No. 631,864.

*To all whom it may concern:*

Be it known that I, GEORGE JACOBS, a citizen of the United States, residing at Cleveland, in the county of Cuyahoga and State of Ohio, have invented certain new and useful Improvements in and Relating to Filing Appliances, of which the following is a specification.

This invention relates to filing appliances employing a series of frames or holders adapted to support papers, bills, slips and the like for classifying or keeping purposes.

For the purpose of illustration, I have, in the accompanying drawings, shown and herein described one form of filing appliance embodying my invention.

Figure 1 is a view, partly in elevation and partly in section, of a filing appliance embodying my invention. Fig. 2 is a fragmentary elevation of the leaves showing a portion of them in a reclined position. Fig. 3 is a transverse sectional view on the line 3—3 of Fig. 1. Figs. 4 and 5 are detail views showing the stationary and movable supporting means, respectively, for the opposite end frames. Fig. 6 is a perspective view of one of the movable supports for one end frame. Figs. 7, 8, 9 and 10 are detail views of the frame structure. Figs. 11 and 12 the detail views illustrating a modified form of certain parts of the invention.

In the drawings, 1 indicates a casing or housing adapted to support a plurality of frames or holders 2. The casing 1 preferably comprises a lower or desk portion $1^a$ and a rear wall $1^b$ which forms a back for the rearmost frame. The lower portion $1^a$ of the casing may consist of a bottom $1^c$, and sides $1^d$, which are preferably extended upwardly along their rear portions to inclose the opposite sides of the frames 2. Suitable drawers or trays $1^e$, $1^e$, may be slidably mounted in the desk $1^a$, guides $1^f$ for the drawers or trays being formed in the sides $1^d$. The desk $1^a$ may also be provided with a transparent top $1^g$, below which may be provided an index carrying tray $1^h$.

Each frame 2, comprises a back $2^a$, preferably formed of sheet metal and a series of clamping devices 3, one suitable type of the latter being shown as formed from resilient wire and carrying an eye signaling device $3^a$. Each frame may also be provided with one or more longitudinally extending strips 4, on its opposite faces, arranged parallel to each other. These strips divide the adjacent face into pockets and form side walls to prevent lateral movement of the papers filed behind the clamping devices 3. They also operate as spacing devices between adjoining frames and maintain the backs thereof at uniform distances from each other at all points, thus preventing any sagging or buckling of the backs between their opposite side edges.

$2^b$ indicates side plates or walls extending along each side or edge of each frame 2. Each of these plates or walls extends laterally or perpendicularly to the adjacent back $2^a$ and in opposite directions and alines with the side plates or walls of the adjoining frame or frames. It thus serves to close the spaces between the frames on all four of their sides. These plates have the same functions as the strips in forming spacing means between adjoining frames and walls for the pockets on each back $2^a$. Each rim plate is preferably formed from sheet metal which is doubled back on itself along two parallel lines $2^c$, $2^c$, to form inner and outer walls $2^{c'}$. The opposite longitudinally free edges of the rim plates are arranged to engage with the opposite faces of the adjacent back $2^a$. In order to firmly secure each rim plate $2^b$ and back $2^a$ together, each edge of the back $2^a$ is provided with a flange $2^d$, over which one edge of the plate is folded or bent. As the front and rear frames 2 support papers on their inner faces only, it will be understood that the side plates $2^b$ extend laterally from the inner faces only thereof.

$2^e$ indicates the pivot plates or devices to which the pivots and connectors, which will be later described, for each frame are connected. The pivot plates preferably extend downwardly in line with the opposite side plates for the adjacent frame 2. Each plate is formed with an opening $2^f$ to receive a pivot pin 5. The plate $2^e$ is preferably formed by extending the outer wall $2^{c'}$ of one of the side plates $2^b$ downwardly, as shown at $2^g$ and this wall may be reinforced by a similar extension, $2^{g'}$ of the outer wall $2^{c'}$ of the lower horizontal plate $2^b$, the extension $2^{g'}$ being bent to lie parallel with the extension $2^g$.

$2^h$ indicates a reinforcing plate preferably of angular form and having one face arranged between the extensions $2^g$, $2^{g'}$, and its opposite face arranged below the doubled over walls of the horizontal side plate $2^b$. In order to permit the positioning of the reinforcing plate $2^h$, the back $2^a$ is cut away as shown at $2^{a\prime}$.

$2^j$ indicates an opening formed in each pivot plate $2^e$ preferably above and slightly forward of the central longitudinal plane of the frame.

$2^k$ indicates a series of links, for connecting the frames together, one link being arranged between each frame and the next frame immediately forward or rearward thereof. As will be later understood, these links support the frames in stepped relationship when in normal position and permit them to be reclined and also to move longitudinally relative to each other as they are operated from one position to another. Incident to this latter operation, the frames may be arranged in a rectangular pack for storing in a vault or other safe place. Each link $2^k$ is pivotally connected at one end to the pivot pin 5 of the adjacent frame 2 and at its opposite end to a pivot pin $2^l$ mounted in the opening $2^j$ of the frame immediately in front thereof.

6 indicates stationary means for supporting one end frame 2 of the series, such for example, the rearmost frame. These means may consist of a pair of sockets $6^a$, fixed to the inner faces of the opposite sides $1^d$, and arranged to receive laterally projecting pins $2^m$ carried by the opposite ends of the rear leaf at its lower end. The supporting means 6 may also include a device $6^b$, carried by the casing back $1^b$ and arranged to engage the rear frame, preferably at its upper edge, in order to hold it rigidly in upright position. The device $6^b$ may be constructed to permit the removal of the frames at will.

7 indicates the movable supporting means for the front frame 2. These means may comprise a pair of slides $7^a$, having hook or socket devices $7^b$. The said devices are preferably arranged near opposite sides of the casing 1 and in line with and adapted to receive pins or projections $2^n$ extending laterally from the opposite sides of the front frame. As will be understood from the drawings, the socket members $7^b$ and pins $2^n$ form the supporting means from the front frame and permit the latter to swing from a normal or vertical position to a horizontal position and vice versa.

8 indicates suitable guides for slidably supporting the slides $7^a$. Suitable antifriction devices, such as rollers $7^c$, preferably carried by the slides, may be provided therefor.

$2^i$ indicates a support carried by each frame and arranged to engage the adjacent link intermediate its ends as shown in the drawings. The purpose of these supports is, in coöperation with the links and the supports 6 and 7 for the frames, to maintain the frames one relative to another in a predetermined arrangement, when they are in normal position. As a result, the frames, between the opposite end frames do not sag, but are held in proper stepped relationship at their upper ends. These supports $2^i$ preferably extend laterally from the side plates $2^b$ are preferably formed by slitting or cutting the metal constituting the inner and outer walls $2^{c\prime}$ and the flange $2^d$, inwardly from one edge of the plate $2^b$ and then downwardly. As the lug $2^i$ is formed of several thicknesses of metal, it is capable of supporting a comparatively heavy weight.

As will be understood from the foregoing description, when one of the frames is operated from the normal to the horizontal position, the link $2^k$ between said frame and the frame immediately behind it will cause the pin $2^l$ to move in a circular path about the axis of the pin 5 to which the said link $2^k$ is connected. Such operation will result in drawing rearward the last frame operated and also all the frames, as a unit, which may be forward thereof (the slides 7 permitting such movement). When the frames are returned to normal position they move forwardly. From a comparison of the position of those frames in Fig. 2, which have been operated, with those which remain in normal position, it will be understood that the rearward movement of each frame is in effect a longitudinal movement relative to the next rearward frame, so that when the frames are reclined they become superposed one on the other.

9 indicates suitable means tending to return the slides 7 to normal position and thus operate to maintain the frames in normal position. One suitable form of such means may comprise a weight $9^a$, mounted to move vertically, and operatively connected by a flexible connector or connectors $9^b$ passing over one or more pulleys $9^c$ with the forward ends of the slides $7^a$.

Another form of means for returning the slides to normal position may comprise a pair of springs 10, each connected at one end to some suitable part of the casing and connected at its opposite end to the adjacent slide 7 and arranged to be put under tension when said slide is moved rearwardly.

$8^a$ indicates a slot, formed in each guide 8, through which the socket device $7^b$ extends.

It will be apparent that my invention consists of but a few simple parts, which may be easily assembled and that the intermediate supports for the frames operate to take the strains due to the weight of the frames and thus relieve the pivots and links of undue stresses.

To those skilled in the art of making filing appliances of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:—

1. In a filing appliance, the combination of a series of assembled frames arranged face to face, devices connecting the frames together and permitting them to swing relative to each other, supports for the opposite end frames, and means engaging and coöperating with said connecting devices for supporting the frames in a predetermined arrangement.

2. In a filing appliance, the combination of a series of assembled frames arranged face to face, devices connecting the frames together and permitting them to swing relative to each other, supports for the opposite end frames, and means, one carried by each frame, engaging and coöperating with said connecting devices for supporting the frames in a predetermined arrangement.

3. In a filing appliance the combination of a series of assembled frames, a link pivotally connected at its opposite ends to each frame and an adjoining frame, whereby all the frames are connected together, supports for the opposite end frames, and a device carried by each frame arranged to engage the link between said frame and the adjoining frame for preventing the sagging of said frames relative to each other.

4. In a filing appliance, the combination of a series of frames each provided with a projection, a series of links each connected at its opposite ends to two adjoining frames and permitting the frames to be reclined relative to each other, means for fixedly supporting one end frame, and means for movably supporting the other end frame, the said projections coöperating with the links to support the frames in stepped relationship when in normal position.

5. The combination of a series of frames, devices connecting said frames together permitting them to swing and also move longitudinally relatively to each other, supporting means for the opposite end frames, and means carried by the frames and coöperating with said connecting devices to support said frames in stepped relationship when they are in normal position.

6. The combination of a series of frames, a series of links each pivotally connected at its opposite ends for connecting two adjoining frames together and permitting said frames to swing and also move longitudinally relatively to each other, supporting means for the opposite end frames, and devices, one carried by each frame coöperating with the adjacent connecting link, for supporting said frames in stepped relationship when they are in normal position.

7. A filing appliance including a plurality of frames arranged in upright position, links pivotally connected to the lower portions of adjacent frames, and means for normally holding the links in forwardly extended position to support the forward adjacent frame.

8. A filing appliance including a frame provided on one end thereof with a rigid lug projecting beyond the plane of one side of the frame, and a hinging link pivotally connected to the frame and limited by the lug in pivotal movement in one direction only.

9. A filing appliance including a plurality of frames normally arranged in upright position, links pivotally connected to the lower portions of adjacent frames, and stop-devices in coöperation with the frames and the links for normally holding the links in forwardly extended position.

10. In a filing appliance, the combination with a plurality of normally upright frames, of links hingedly connected to the lower end of one of the frames and normally extending downwardly and also forwardly to the farther side of the adjacent one of the frames and hingedly connected thereto, said adjacent frame being uprightly supported in balanced position upon and solely by said links, and means for maintaining the links in normal extended position.

In testimony whereof I affix my signature, in the presence of two witnesses.

GEORGE JACOBS.

Witnesses:
JNO. H. NEWEY,
JOSEPH LANGYEL.

Copies of this patent may be obtained for five cents each, by addressing the "Commissioner of Patents, Washington, D. C."